US012770334B2

(12) United States Patent
Liu

(10) Patent No.: US 12,770,334 B2
(45) Date of Patent: Oct. 20, 2026

(54) RENDERING OPTIMIZATION METHOD, ELECTRONIC DEVICE, AND COMPUTER-READABLE STORAGE MEDIUM

(71) Applicant: Honor Device Co., Ltd., Shenzhen (CN)

(72) Inventor: Zhichao Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 181 days.

(21) Appl. No.: 18/838,811

(22) PCT Filed: Apr. 27, 2023

(86) PCT No.: PCT/CN2023/091244
§ 371 (c)(1),
(2) Date: Aug. 15, 2024

(87) PCT Pub. No.: WO2024/027237
PCT Pub. Date: Feb. 8, 2024

(65) Prior Publication Data

US 2025/0157151 A1 May 15, 2025

(30) Foreign Application Priority Data

Aug. 4, 2022 (CN) ......................... 202210934834.4

(51) Int. Cl.
*G06T 17/20* (2006.01)
*G06T 15/06* (2011.01)
*G06T 15/80* (2011.01)

(52) U.S. Cl.
CPC ............ *G06T 17/205* (2013.01); *G06T 15/06* (2013.01); *G06T 15/80* (2013.01); *G06T 2210/21* (2013.01); *G06T 2210/36* (2013.01)

(58) Field of Classification Search
CPC ....... G06T 17/205; G06T 15/06; G06T 15/80; G06T 2210/21; G06T 2210/36;
(Continued)

(56) References Cited

U.S. PATENT DOCUMENTS

| | | | | |
|---|---|---|---|---|
| 6,765,574 B1 * | 7/2004 | Mao | G06T 17/005 | 345/428 |
| 2006/0061584 A1 * | 3/2006 | Kristiansen | G06T 15/04 | 345/582 |

(Continued)

FOREIGN PATENT DOCUMENTS

| | | | |
|---|---|---|---|
| CN | 105336003 A | 2/2016 |
| CN | 108090947 A | 5/2018 |

(Continued)

OTHER PUBLICATIONS

Tom Bernick, "LOD Selection—OpenGL—Khronos Forums," XP093267644, Retrieved from the Internet, URL: https://community.khronos.org/t/lod-selection/49560/2, 4 pages (Mar. 1, 2004).

(Continued)

*Primary Examiner* — William A Beutel
(74) *Attorney, Agent, or Firm* — Leydig, Voit & Mayer, Ltd.

(57) ABSTRACT

This application provides a rendering optimization method, an electronic device, and a computer-readable storage medium. The method is applied to the electronic device, including: determining first polygonal mesh data corresponding to an object model in a scene; creating a bounding box corresponding to the object model based on the first polygonal mesh data; determining a pixel range covered when the bounding box is projected onto a screen of the electronic device, obtaining a relationship between a quantity of pixels covered by the bounding box and a quantity of pixels of the screen, and determining a distance between an observation angle in the scene and the object model; deter- (Continued)

mining a level of detail (LOD) level corresponding to the object model based on the distance and the relationship, and updating the first polygonal mesh data to second polygonal mesh data based on the LOD level.

20 Claims, 7 Drawing Sheets

(58) Field of Classification Search
CPC ..... G06T 2210/12; G06T 15/20; G06T 17/20; G06T 15/00
See application file for complete search history.

(56) References Cited

U.S. PATENT DOCUMENTS

| | | | | |
|---|---|---|---|---|
| 2006/0158450 | A1* | 7/2006 | Ferguson | G06T 13/00 345/423 |
| 2010/0315423 | A1* | 12/2010 | Ahn | G06T 15/005 345/426 |
| 2014/0198097 | A1 | 7/2014 | Evans | |
| 2017/0091992 | A1* | 3/2017 | Rogers | G06T 17/20 |
| 2021/0390757 | A1* | 12/2021 | Muthler | G06T 15/06 |

FOREIGN PATENT DOCUMENTS

| | | | |
|---|---|---|---|
| CN | 113674389 | A | 11/2021 |
| CN | 114219902 | A | 3/2022 |
| CN | 114565709 | A | 5/2022 |

OTHER PUBLICATIONS

Anonymous, "Theoretical LOD system?" Polycount, XP093267647, Retrieved from the Internet, URL:https://polycount.com/discussion/121313/theoretical-lod-system, 5 pages 5 (May 1, 2013).

* cited by examiner

RENDERING OPTIMIZATION METHOD, ELECTRONIC DEVICE, AND COMPUTER-READABLE STORAGE MEDIUM

CROSS-REFERENCE TO RELATED APPLICATIONS

This application is a national stage of International Application No. PCT/CN2023/091244, filed on Apr. 27, 2023, which claims priority to Chinese Patent Application No. 202210934834.4, filed on Aug. 4, 2022. The disclosures of both of the aforementioned applications are hereby incorporated by reference in their entireties.

TECHNICAL FIELD

The application relates to the field of electronic technologies, and in particular, to a rendering optimization method, an electronic device, and a computer-readable storage medium.

BACKGROUND

With development of computer technologies, more and more application programs, for example, a game and a video, are required to display more realistic images, in other words, are required to display scenes with special effects, such as virtual simulation, virtual reality, and enhanced display; and a graphics rendering technology is used, to improve authenticity of a picture by using the rendering technology, thereby bringing a better experience to a user. Therefore, how to improve the authenticity of the picture becomes a main target of the industry.

A ray tracing technology is based on a real physical rule, and therefore can generate a rendering result close to the real world and attract much attention. As a hardware-accelerated real-time ray tracing technology is more and more widely applied in the field of personal computers (PCs) and consoles, vulkan-based real-time ray tracing at a mobile terminal is also supported by many mobile-terminal chip products. However, even if hardware acceleration is applied, ray tracing is still a technology with a heavy load at the mobile terminal. A large amount of calculation is still required. As a result, power consumption of a chip is greatly increased, and an operation frame rate of an electronic device is also affected.

SUMMARY

In view of this, the present disclosure provides a rendering optimization method, an electronic device, and a computer-readable storage medium. The method can reduce an amount of calculation in an image rendering process, and reduce a chip power consumption load when keep running a frame rate with special effects.

Some embodiments of this application provide a rendering optimization method. The following describes this application from a plurality of aspects, and implementations and beneficial effects of the plurality of following aspects may refer to each other.

According to a first aspect, the present disclosure provides a rendering optimization method, applied to an electronic device, and the method includes: determining first polygonal mesh data corresponding to an object model in a scene, where the first polygonal mesh data is for describing the object model; creating a bounding box corresponding to the object model based on the first polygonal mesh data; determining a pixel range covered when the bounding box is projected onto a screen of the electronic device, obtaining a relationship between a quantity of pixels covered by the bounding box and a quantity of pixels of the screen, and determining a distance between an observation angle in the scene and the object model; determining a level of detail LOD level corresponding to the object model based on the distance and the relationship, and updating the first polygonal mesh data to second polygonal mesh data based on the LOD level; and rendering the object model based on the second polygonal mesh data.

According to the rendering optimization method in embodiments of this application, a simplification degree, namely, a LOD level of a model is determined by calculating a visual range proportion of the model in a screen and a distance between an observation angle and the model, to implement dynamic adjustment of the LOD level, so that a quantity of triangular meshes forming the model is reduced when geometry of the model is maintained. In this way, calculation consumption of ray tracing can be effectively reduced, and realistic image quality can be efficiently generated.

In an embodiment of the first aspect of this application, the determining a LOD level corresponding to the object model based on the distance and the relationship includes: performing weighted summation calculation on the distance and the relationship respectively, to obtain a summation result; and determining the LOD level based on the summation result.

In an embodiment of the first aspect of this application, the determining a distance between an observation angle in the scene and the object model includes: obtaining first world coordinates of the observation angle in world space and second world coordinates of the object model in the world space; and determining the distance between the observation angle and the object model based on the first world coordinates and the second world coordinates.

In an embodiment of the first aspect of this application, the updating the first polygonal mesh information to second polygonal mesh information based on the LOD level includes: removing, based on the LOD level, a part of polygonal mesh data from the first polygonal mesh information by using a polygonal mesh tile reduction algorithm to obtain the second polygonal mesh data. The LOD level obtained through the algorithm can be dynamically adjusted based on a real scene, to ensure a realistic degree of a picture when reducing an amount of calculation as much as possible.

In an embodiment of the first aspect of this application, the rendering the object model based on the second polygonal mesh data includes: when the electronic device determines that a rendering mode corresponding to the object model is ray tracing rendering, obtaining the second polygonal mesh information; and calculating an intersection of a ray and the object model in the scene by using a ray tracing shader based on the second polygonal mesh information, and shading the object model based on the intersection.

In an embodiment of the first aspect of this application, the method further includes: when the electronic device determines that the rendering mode corresponding to the object model is normal rendering, obtaining the first polygonal mesh information corresponding to the object model in the scene, and shading the object model by using a rasterized shader.

In an embodiment of the first aspect of this application, the creating a bounding box corresponding to the object model based on the first polygonal mesh information includes: determining, based on the first polygonal mesh information, maximum values and minimum values of the object model in an X direction, a Y direction, and a Z direction in coordinates of the object model; and determining the bounding box based on the maximum values and the minimum values.

In an embodiment of the first aspect of this application, the relationship between the quantity of pixels covered by the bounding box and the quantity of pixels of the screen is a ratio of the quantity of pixels covered by the bounding box to the quantity of pixels of the screen.

In an embodiment of the first aspect of this application, a weight of the distance is set to range from 0.1 to 0.5, and a weight of the ratio ranges from 0.5 to 0.9.

In an embodiment of the first aspect of this application, the weight of the distance is set to 0.3, and the weight of the ratio is 0.7. The ratio is more beneficial to ensuring the realistic degree of the picture when reducing the amount of calculation as much as possible.

In an embodiment of the first aspect of this application, the first polygonal mesh information includes a quantity of polygons corresponding to the object model not simplified through the LOD level, and vertex coordinates and vertex indexes of the polygon.

In an embodiment of the first aspect of this application, the second polygonal mesh information includes a quantity of polygons corresponding to the object model simplified based on the LOD level, and the vertex coordinates and the vertex indexes of the polygon.

In an embodiment of the first aspect of this application, the polygon is a triangle.

According to a second aspect, this application provides an electronic apparatus, including:

- a mesh data obtaining module, configured to determine first polygonal mesh data corresponding to an object model in a scene, where the first polygonal mesh data is for describing the object model;
- a bounding box creation module, configured to create a bounding box corresponding to the object model based on the first polygonal mesh data;
- a ratio determining module, configured to determine a pixel range covered when the bounding box is projected onto a screen of an electronic device, obtain a relationship between a quantity of pixels covered by the bounding box and a quantity of pixels of the screen, and determine a distance between an observation angle in the scene and the object model;
- a LOD calculation module, configured to determine a level of detail LOD level corresponding to the object model based on the distance and the relationship, and update the first polygonal mesh data to second polygonal mesh data based on the LOD level; and
- a rendering module, configured to render the object model based on the second polygonal mesh data.

According to the electronic apparatus in embodiments of this application, a simplification degree, namely, a LOD level of a model is determined by calculating a visual range proportion of the model in a screen and a distance between an observation angle and the model, to implement dynamic adjustment of the LOD level, so that a quantity of triangular meshes forming the model is reduced when geometry of the model is maintained. In this way, calculation consumption of ray tracing can be effectively reduced, and realistic image quality can be efficiently generated.

In an embodiment of the second aspect of this application, the LOD calculation module is further configured to perform weighted summation calculation on the distance and the relationship respectively, to obtain a summation result; and determine the LOD level based on the summation result. The LOD level obtained through the algorithm can be dynamically adjusted based on a real scene, to ensure a realistic degree of a picture when reducing an amount of calculation as much as possible.

In an embodiment of the second aspect of this application, the ratio determining module is further configured to obtain first world coordinates of the observation angle in world space and second world coordinates of the object model in the world space; and determine the distance between the observation angle and the object model based on the first world coordinates and the second world coordinates.

In an embodiment of the second aspect of this application, the LOD calculation module is configured to: remove, based on the LOD level, a part of polygonal mesh data from the first polygonal mesh information by using a polygonal mesh tile reduction algorithm to obtain the second polygonal mesh data.

In an embodiment of the second aspect of this application, the rendering module is configured to:

- when the rendering module determines that a rendering mode corresponding to the object model is ray tracing rendering,
- obtain the second polygonal mesh information; and
- calculate an intersection of a ray and the object model in the scene by using a ray tracing shader based on the second polygonal mesh information, and shade the object model based on the intersection.

In an embodiment of the second aspect of this application, the rendering module is further configured to:

- when the rendering module determines that the rendering mode corresponding to the object model is normal rendering,
- obtain the first polygonal mesh information corresponding to the object model in the scene, and shade the object model by using a rasterized shader.

In an embodiment of the second aspect of this application, the bounding box creation module is configured to determine, based on the first polygonal mesh information, maximum values and minimum values of the object model in an X direction, a Y direction, and a Z direction in coordinates of the object model; and determine the bounding box based on the maximum values and the minimum values.

In an embodiment of the second aspect of this application, the relationship between the quantity of pixels covered by the bounding box and the quantity of pixels of the screen is a ratio of the quantity of pixels covered by the bounding box to the quantity of pixels of the screen.

In an embodiment of the second aspect of this application, a weight of the distance is set to range from 0.1 to 0.5, and a weight of the ratio ranges from 0.5 to 0.9.

In an embodiment of the second aspect of this application, the weight of the distance is set to 0.3, and the weight of the ratio is 0.7. The ratio is more beneficial to ensuring the realistic degree of the picture when reducing the amount of calculation as much as possible.

In an embodiment of the second aspect of this application, the first polygonal mesh information includes a quantity of polygons corresponding to the object model not simplified through the LOD level, and vertex coordinates and vertex indexes of the polygon.

In an embodiment of the second aspect of this application, the second polygonal mesh information includes a quantity of polygons corresponding to the object model simplified based on the LOD level, and the vertex coordinates and the vertex indexes of the polygon.

In an embodiment of the second aspect of this application, the polygon is a triangle.

According to a third aspect, this application further provides an electronic device, including: a memory, configured to store instructions executed by one or more processors of the device; and a processor, configured to execute the instructions, to enable the electronic device to perform any method in the technical solutions of the first aspect.

According to a fourth aspect, this application further provides a computer-readable storage medium, storing a computer program, where the computer program, when run by a processor, enables the processor to perform any method in the technical solutions of the first aspect.

According to a fifth aspect, this application further provides a computer program product including instructions, where the computer program product, when run on an electronic device, enables a processor to perform any method in the technical solutions of the first aspect.

DESCRIPTION OF EMBODIMENTS

Figure 1:
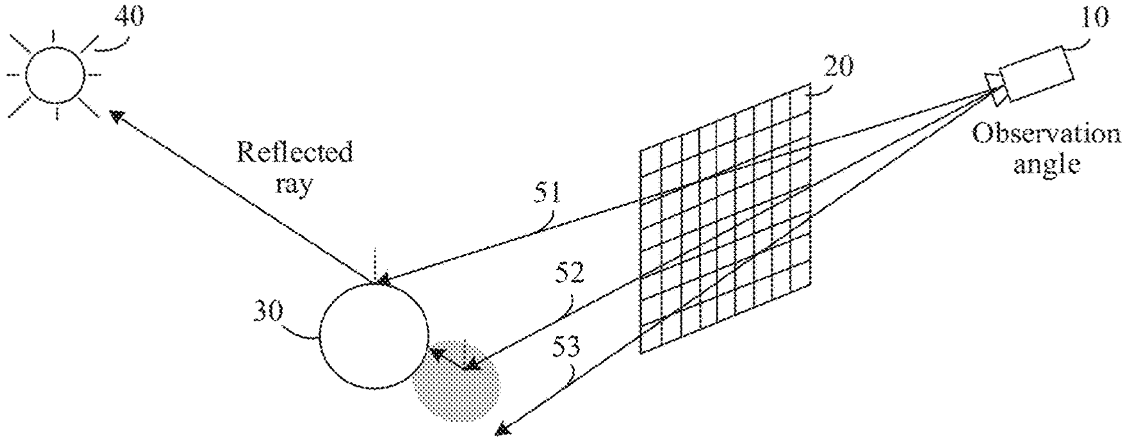
FIG. 1 is a diagram of a scene of ray tracing according to an embodiment of this application.

With reference to the accompanying drawings in embodiments of this application, the following clearly describes the technical solutions in embodiments of this application.

To facilitate understanding of the technical solutions of this application, a technical problem to be resolved in this application is first described below.

To facilitate understanding of the technical solutions of this application, terms in this application are first explained.

A level of detail (LOD) level can perform hierarchical display on details of an object model in world space when a distance between a camera (an observation angle) and the object model (an object in a scene) is different. When the observation angle is close to the object model, a LOD level with high object fineness is displayed; and when the observation angle is far away from the object model, a LOD level with low object fineness is displayed, thereby reducing performance costs of an electronic device.

A tile refers to a plane formed by a smallest plane formation unit, namely, a polygon, in two-dimensional or three-dimensional space. Generally, a model in space needs to be divided into countless tiny tiles during rendering, where a LOD level determines a quantity of tiles.

A view plane image refers to a plane image corresponding to a screen of an electronic device, that is, a two dimensional (2D) plane, and the view plane image is correspondingly provided with pixels, in other words, the view plane image presents a rendering result by using a pixel as a unit.

Rasterization is a process in which an object model in a 3D scene is segmented through a polygon, such as, a triangle, and three-dimensional coordinates of vertices of the triangle are converted into a two-dimensional view plane image, so that the object model corresponds to some pixels on the view plane image, to be specific, mathematical description of the object model and color information related to the object model are converted into pixels corresponding to positions and colors for filling the pixels on a screen, to obtain a raster image.

Raytracing is also referred to as light trace tracing or ray tracing, and is a method for presenting a three-dimensional (3D) image on a two-dimensional (2D) screen. The ray tracing tracks a ray interacting with an optical surface, to obtain an object model with a ray path. A principle is that when the ray is projected onto a surface of an object, one or more of the following phenomena usually occur, for example, light absorption, light reflection, light refraction, and light diffuse reflection. After the phenomena, a light spectrum changes, to be specific, the ray always goes through a series of attenuation and enters human eyes at last, and the ray tracing is to figure out a case in which the ray goes through the series of attenuation after being emitted and then enters the human eyes. Therefore, a sense of reality in a scene is virtualized through simulation.

The ray tracing may include forward ray tracing and backward ray tracing. The forward ray tracing means that a ray propagates along a straight line from a light source, and interaction between the ray and a surface of an object occurs in a propagation process in a scene. Some rays are absorbed by the object, some rays are projected through the object or reflected by the object, and a part of rays are even reflected a plurality of times among a plurality of objects, and enter the human eyes (an observation angle) at last.

The backward ray tracing means that a ray is emitted from the observation angle (for example, a camera in a scene), the ray interacts with a surface of an object in the scene after passing through a view plane corresponding to a screen. Some rays are absorbed by the object, some rays are projected through the object or reflected by the object, and a part of rays are even reflected a plurality of times among a plurality of objects. Color information in these ray paths is calculated and accumulated, and then rendered to corresponding pixels, to obtain a final render target.

To facilitate understanding of the technical solutions of this application, the technical problem to be resolved in this application is first described.

With reference to the accompanying drawings, the following describes a rendering optimization method in embodiments of this application.

Refer to FIG. 1. FIG. 1 is a diagram of a scene of ray tracing according to an embodiment of this application. As shown in FIG. 1, in the scene, a camera 10 (an observation angle) located in an application scene, a view plane image 20, an object model 30, a light source 40, a ray 51, a ray 52, and a ray 53 are included. The view plane image 20 corresponds to a screen of a device. A rendering result of the view plane image 20 uses a pixel as a unit, and a value of each pixel is based on a color value corresponding to a path of a ray finally calculated based on the fact that the ray may undergo physical phenomena such as reflection, refraction, diffuse reflection, and light absorption on a surface of an object based on different materials of the object after the ray passes through the pixel and collides with an object model in the scene (where the process is referred to as a ray tracing process). As shown in FIG. 1, the ray 51, the ray 52, and the ray 53 all pass through pixels in the view plane image 20. The ray 51 intersects with the object model 30, and reflected light directly reaches the light source, which indicates that there is a point that can be directly irradiated by the light source. After the ray 52 intersects with the ground, the reflected light collides with the object model 30, which indicates that an intersection of the ray 52 and the ground is not directly irradiated by the light source 40, and therefore a shadow is formed. The ray 53 does not intersect with any object. Color values corresponding to paths of such rays are finally obtained through calculation. A color value corresponding to each ray is output to a pixel of the view plane image 20 corresponding to the ray, to obtain a final render target image, and a final rendered image is displayed through a display of an electronic device.

In some embodiments, a quantity of pixels corresponding to the view plane image 20 is equal to or in a proportional relationship with a quantity of pixels corresponding to the screen. When the quantity of pixels corresponding to the view plane image is in a proportional relationship with the quantity of pixels corresponding to the screen, an image, when displayed on the screen, can be properly scaled up or scaled down based on the proportional relationship, to adapt to the pixels corresponding to the screen.

The ray tracing described above has a strong gain effect in improving authenticity of a rendered picture, for example, has the gain effect in the following aspects: shadow overlaying, reflection, ambient light shielding, semi-transparent material, and global illumination. For algorithms used in the foregoing aspects, a large number of intersections of ray vectors and a three-dimensional scene needs to be calculated. Objects in the scene are all formed by many tiles. The tiles form a spatial structure of the object model. One pixel in the view plane image (corresponding to the screen) may correspond to one or more tiles, that is, a path of the ray passing through the pixel may pass through one or more tiles, and a color value corresponding to the pixel is calculated based on the tiles (the path corresponding to the ray). When there are many object models in the three-dimensional scene, or the spatial structure of the object model is complex (there are many tiles), a quantity of intersections calculated between rays and a surface of an object is increased, and calculation efficiency is increased with a data volume and complexity of a spatial structure in the three-dimensional scene. However, in real life, when the observation angle is far away from an object, many details are not clear to naked eyes. In this case, if a data volume of a spatial structure at a close distance is used for calculating an intersection of the ray and the object, an amount of calculation is large, but a good visual effect is not achieved. As a result, an amount of calculation of the device is large, calculation efficiency is low, and even an image output frame rate of the device is affected.

Based on the existing problem, this application provides a rendering optimization method. A data volume of a ray tracing acceleration structure is dynamically changed based on a change in a scene, thereby optimizing ray intersection calculation efficiency of a ray and an object model in the scene, and improving calculation performance of ray tracing.

Figure 2:
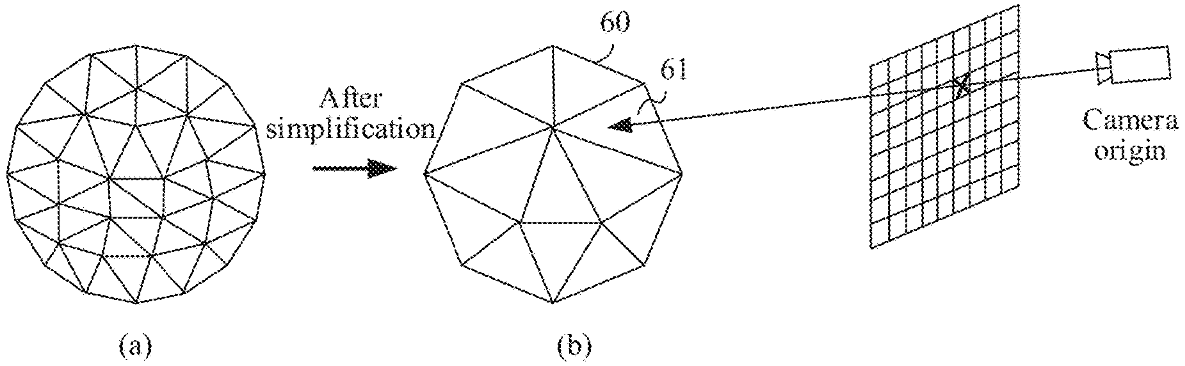
FIG. 2 is a schematic diagram of a mesh structure change of an object model according to an embodiment of this application.

With reference to the scene shown in FIG. 1, the rendering optimization method in embodiments of this application is described. In some embodiments, the object model may be sky, a cloud, a person, a house, a tree, an article, or the like. As shown in FIG. 2, FIG. 2 is a schematic diagram of a mesh structure change of an object model according to an embodiment of this application. In this application, an example in which the object model is a sphere is used for description. In an update process of a three-dimensional scene, polygonal mesh data corresponding to the object model in the scene is determined, for example, a diagram of a mesh structure of the sphere shown in (a) in FIG. 2, to be specific, a surface of the object model is divided into tiles. For example, a tile is a triangular structure, and the surface of the object model is divided into triangular meshes. For a division process, refer to a division method in conventional technologies. Triangular mesh data (corresponding to first polygonal mesh data) for describing the object model is obtained after division, and the triangular mesh data may include a quantity of triangles, vertex coordinates and vertex index data of the triangle, and the like. The vertex coordinates of the triangle are converted into world space (word space) through a model matrix (model matrix), to obtain world coordinates of vertices. Specifically, the model matrix may be a preset matrix. All to-be-rendered object models in the scene can be converted into same world space (word space) through a same model matrix. For a conversion process, refer to the conventional technologies. Based on world coordinates of the object model, a bounding box, for example, an axis aligned bounding box (AABB), an oriented bounding box (OBB), or a spherical bounding box, is established for geometry. The bounding box surrounds the geometry therein. The bounding box is rendered into a view plane image corresponding to a screen, to obtain a pixel range covered by the bounding box in the view plane image. A proportion of a quantity of pixels covered by the bounding box to a quantity of pixels of the view plane image is calculated, in other words, a ratio (a relationship) of the quantity of pixels covered by the bounding box to the quantity of pixels of the screen is determined. A distance between a camera (an observation angle) and the object model in the world space is determined, a level of detail LOD level corresponding to the object model is determined based on the distance and the ratio, and polygonal mesh data is updated based on the LOD level, to obtain triangular mesh data (second polygonal mesh data) corresponding to the LOD level. For a structure thereof, refer to a mesh structure 60 of the object model after simplification shown in (b) in FIG. 2. An electronic device performs ray tracing on the object model based on the updated triangular mesh data. To be specific, as shown in (b) in FIG. 2, the electronic device calculates an intersection of a ray and a triangular mesh 61 in a model 60, calculates a color value based on the intersection, and outputs the color value to a corresponding pixel, to obtain a render target.

Based on the rendering optimization method in embodiments of this application, in an update process of a three-dimensional scene, a simplification degree of a model is determined by calculating a visual range proportion of an object model in a screen, and model simplification is performed on the object model in parallel, so that a quantity of triangular meshes forming the model is reduced when geometry of the model is maintained. In this way, when the object model is far away from an observation angle, ray intersection calculation efficiency can be optimized, thereby reducing an amount of calculation, and improving calculation performance of ray tracing.

The electronic device in embodiments of this application may be a mobile phone, a tablet computer, a notebook computer, a PC, a mobile Internet device (MID), or a wearable device, a virtual reality (VR) device, an augmented reality (AR) device, a wireless electronic device in industrial control, a wireless electronic device in self driving, a wireless electronic device in remote medical surgery, a wireless electronic device in smart grid, a wireless electronic device in transportation safety, a wireless electronic device in smart city, a wireless electronic device in smart home, or the like. The electronic device may be a device running a Harmony operating system (HarmonyOS), an Android system, an iOS system, a Windows system, or another system. An application program that needs to render a 3D scene to obtain a two-dimensional image, for example, an application such as a game or a video, may be run in the electronic device.

The following describes the rendering optimization method in embodiments of this application with reference to a specific structure of the electronic device.

Figure 3:
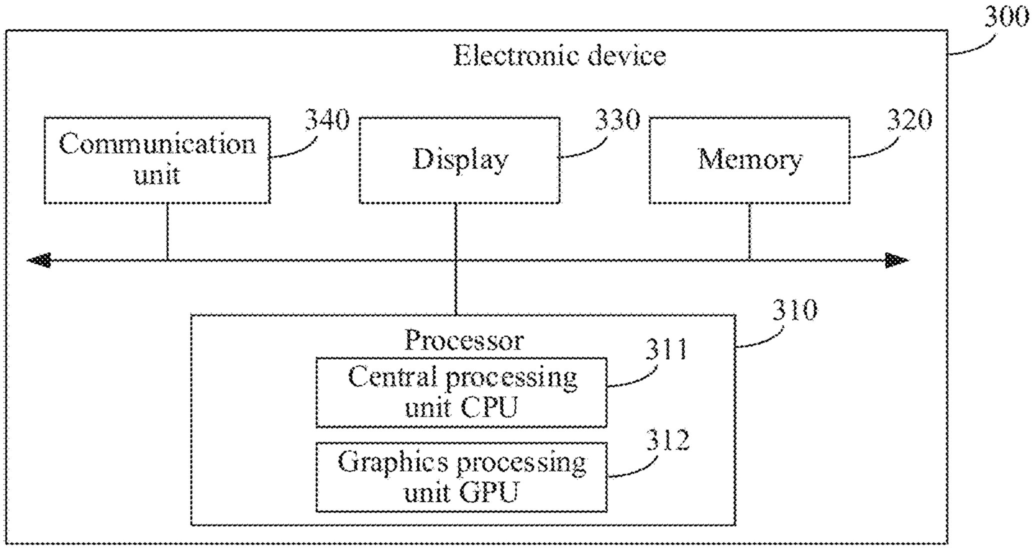
FIG. 3 is a schematic diagram of a structure of an electronic device according to an embodiment of this application.

FIG. 3 is a schematic diagram of a structure of an electronic device 300. As shown in FIG. 3, the electronic device 300 may include a processor 310, a memory 320, a display 330, a communication unit 340, and the like. Such components may be connected by using a communication bus, to implement communication among the components.

It may be understood that, the structure shown in this embodiment of the present disclosure does not constitute a specific limitation on the electronic device 300. In some other embodiments of this application, the electronic device 300 may include more or fewer components than those shown in the figure, or combine some components, or split some components, or arrange different components. The components shown in the figure may be implemented by hardware, software, or a combination of the software and the hardware.

The processor 310 may include one or more processing units. In some embodiments, as shown in FIG. 3, the processor 310 may include a central processing unit (CPU) and a graphics processing unit (GPU).

In some other embodiments, the processor may further include an application processor (AP), a modem processor, an image signal processor (ISP), a controller, a video codec, a digital signal processor (DSP), a baseband processor, a neural-network processing unit (NPU), and/or the like. Different processing units may be independent devices, or may be integrated into one or more processors.

The processor 310 may generate an operation control signal based on instruction operation code and a time sequence signal, to complete control of instruction fetching and instruction execution.

The processor 310 may further arrange a memory, to store instructions and data. In some embodiments, the memory in the processor 310 is a cache. The memory may store instructions or data just used or cyclically used by the processor 310. If the processor 310 needs to use the instructions or data again, the instructions or data may be directly invoked from the memory. For example, during real-time rendering, data corresponding to a to-be-rendered scene, for example, vertex data, coordinate data, a material, and illumination that are of geometry corresponding to a person, a house, and an article may be stored, to avoid repeated access, and reduce waiting time of the processor 310, thereby improving system efficiency.

In an embodiment of this application, a CPU 311 may run an operating system and various application programs. An application program may be a graphics application program, for example, a game or video player. The operating system provides a system graphics library interface. The application program may generate an instruction stream for rendering a graphic or an image frame and required related render data through the system graphics library interface and a drive program provided by the operating system. The instruction stream includes a series of instructions, and the instructions are generally invoke instructions for the system graphics library interface.

A GPU 312 is configured to receive a graphic instruction stream sent by the CPU 311; generate a view plane image in which some pixels are covered by a bounding box through a graphics rendering pipeline; obtain a trajectory of a ray in world space combined with a ray tracing technology, that is, obtain a tile intersecting with the ray; and finally calculate a color value based on the trajectory of the ray in the world space, and output the color value to a corresponding pixel, to obtain a render target. Through a procedure, for example, image layer synthesis of the operating system, the render target is displayed on the display 330 The graphics rendering pipeline, or the rendering pipeline (the pipeline), may be referred to as a rendering assembly line, a pixel assembly line, or a pixel pipeline, which is a parallel processing unit for processing a graphics signal inside the graphics processing unit.

A main function of the graphics rendering pipeline is to generate (or render) a two-dimensional image based on a given virtual camera, a three-dimensional object, a light source, and the like. The GPU may include a plurality of rendering pipelines, and the plurality of rendering pipelines may independently process the graphic signal in parallel. One rendering pipeline may perform a series of operations in a process of rendering the graphic or the image frame. For example, the operations of the one rendering pipeline may be roughly divided into the following: vertex processing, primitive processing, rasterization, fragment processing, and the like.

In this embodiment of this application, the communication unit 340 may include an antenna 1, an antenna 2, a mobile communication module 150, a wireless communication module 160, the modem processor, the baseband processor, and the like, and communication with another electronic device is implemented through cooperation of components.

In some embodiments, the electronic device 300 may be connected to a cloud server through a communication unit, to obtain data of a to-be-rendered object in a 3D scene, or may communicate with the another electronic device to obtain data of a to-be-rendered object.

The electronic device 100 implements a display function through the GPU, a display 194, the application processor, and the like. The GPU is a microprocessor for image processing, and is connected to the display 194 and the application processor. The GPU is configured to perform mathematical and geometric calculation for graphics rendering. The processor 110 may include one or more GPUs, and the one or more GPUs execute program instructions to generate or change display information.

The display 194 is configured to display an image, a video, and the like. The display 194 includes a display panel. The display panel may use a liquid crystal display (LCD), an organic light-emitting diode (OLED), an active-matrix organic light emitting diode (AMOLED), a flex light-emitting diode (FLED), a miniled, a microled, a micro-oLed, a quantum dot light-emitting diode (QLED), or the like. In some embodiments, the electronic device 100 may include one or N displays 194, where N is a positive integer greater than 1.

In an embodiment of this application, when the CPU 311 submits set parameters and vertex data content to the GPU 312, the GPU 312 completes rendering of an object model in a scene based on the data, to obtain a render target, and stores the render target into a frame buffer. A video controller reads data of the frame buffer frame by frame, and the render target is finally displayed on the display 330 after data conversion. A user may observe a render graph with a special effect through the display 330.

The memory 320 may include an internal memory and an external memory. The internal memory may be configured to store computer-executable program code, and the executable program code includes instructions. The internal memory may include a storage program area and a storage data area. The storage program area may store the operating system, an application program required by at least one function (for example, a game or an image playback function), and the like. The storage data area may store data created during use of the electronic device 300 (for example, render target image data obtained through CPU and GPU rendering) and the like. In addition, the internal memory may include a high-speed random access memory, or may include a non-volatile memory, for example, at least one magnetic disk storage device, a flash memory device, or a universal flash storage (UFS).

In some embodiments, the processor 310 runs the instructions stored in the internal memory, for example, the instruction stream for rendering the graphic or the image frame, to enable the GPU to process to-be-rendered data based on the instruction stream.

A software system of the electronic device 300 may use a layered architecture, an event-driven architecture, a micro-core architecture, a micro-service architecture, or a cloud architecture. In embodiments of the present disclosure, an Android system with a layered architecture is used as an example to describe a software structure of the electronic device 300.

Figure 4:
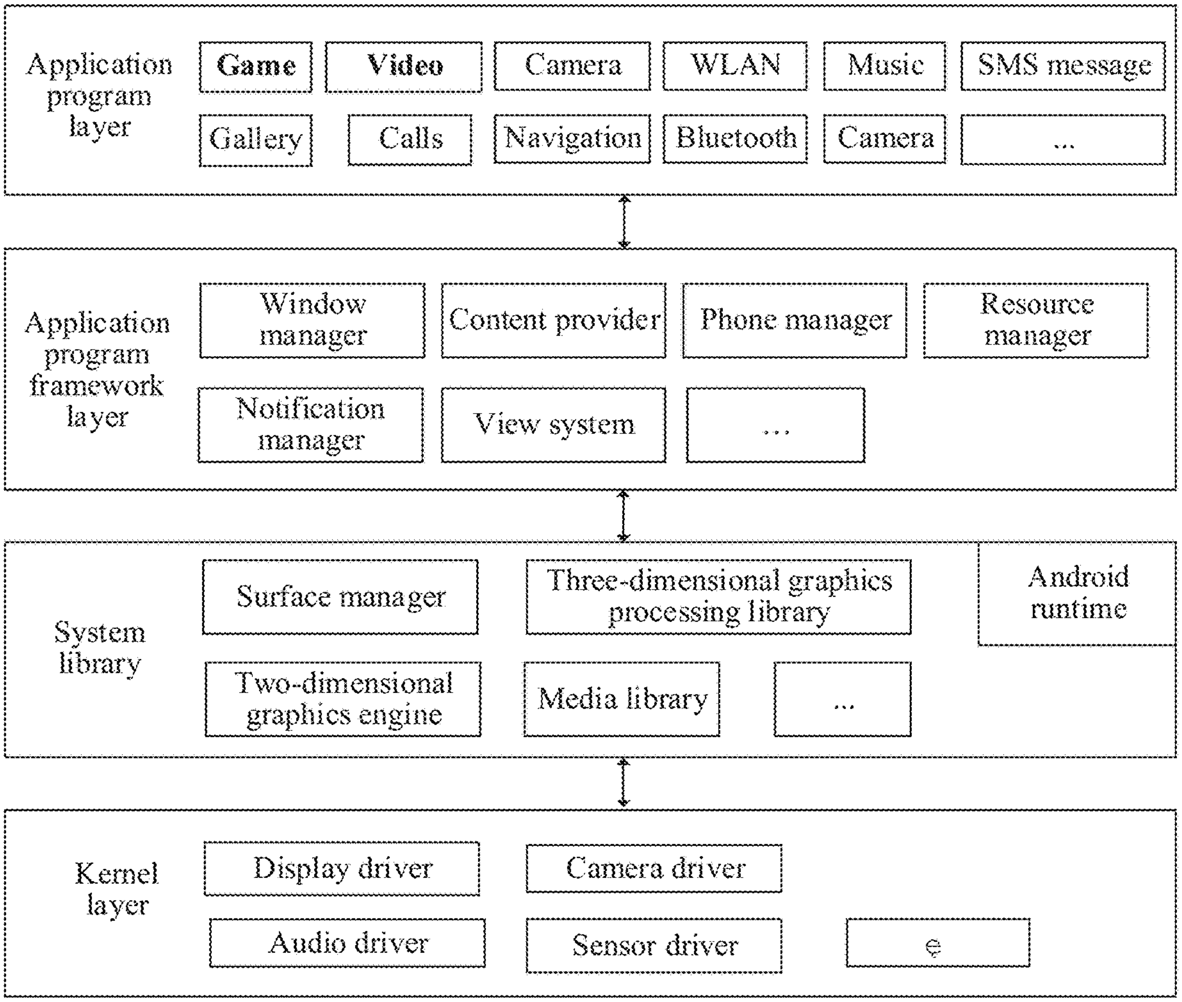
FIG. 4 is a block diagram of a software structure of an electronic device according to an embodiment of this application.

FIG. 4 is a block diagram of the software structure of the electronic device 300 according to an embodiment of the present disclosure.

The layered architecture divides software into a plurality of layers, and each layer has a clear role and division. The layers communicate with each other through a software interface. In some embodiments, the Android system is divided into four layers, which are respectively an application program layer, an application program framework layer, Android runtime and a system library, and a kernel layer from top to bottom.

The application program layer may include a series of application program packages.

As shown in FIG. 4, an application program package may include a game, a video, a gallery, a calendar, a call, a map, a navigation, a WLAN, Bluetooth, music, an SMS message, and other application programs.

The application program framework layer provides an application programming interface (API) and a programming framework for an application program of the application program layer. The application program framework layer includes some predefined functions.

As shown in FIG. 4, the application program framework layer may include a window manager, a content provider, a view system, a phone manager, a resource manager, a notification manager, and the like.

The window manager is configured to manage a window program. The window manager may obtain a display size, so that a final rendered image is displayed on the display based on a corresponding proportion.

The content provider is configured to store and obtain data, and enable the data to be accessed by an application program. The data may include data corresponding to an object model in a game scene, for example, may be a video, an image, an audio, calls made and answered, a browsing history, a bookmark, an address book, and the like.

The view system includes visual control such as a control for displaying a text and a control for displaying a picture. The view system may be configured to construct an application program. A display interface may be formed by one or more views. For example, a display interface including an SMS message notification icon may include a view for displaying a text and a view for displaying a picture.

The resource manager provides various resources, such as a localized character string, an icon, a picture, a layout file, and a video file for an application program.

The Android runtime includes a core library and a virtual machine. The Android runtime is responsible for scheduling and management of the Android system.

The core library includes two parts: one part is a function that needs to be invoked in a Java language, and another part is an Android core library.

The application program layer and the application program framework layer run in the virtual machine. The virtual machine executes Java files of the application program layer and the application program framework layer as binary files. The virtual machine is configured to perform functions such as object lifecycle management, stack management, thread management, security and exception management, and garbage collection.

The system library may include a plurality of functional modules, for example, a surface manager, a media library (Media Libraries), a three-dimensional graphics processing library (for example, OpenGL ES), and a 2D graphics engine (for example, SGL).

The surface manager is configured to manage a display subsystem, and provide fusion of a 2D layer and a 3D layer for a plurality of application programs.

The media library supports playback and recording in a plurality of common audio and video formats, a static image file, and the like. The media library may support a variety of audio and video encoding formats, for example, MPEG4, H.264, MP3, AAC, AMR, JPG, and PNG.

The three-dimensional graphics processing library is configured to implement an image rendering process based on the graphics rendering pipeline, obtain the render target, further perform layer processing on the render target, and the like.

The 2D graphics engine is a drawing engine for 2D drawing.

The kernel layer is a layer between the hardware and the software. The kernel layer includes at least a display driver, a camera driver, an audio driver, and a sensor driver.

The foregoing describes a specific structure of the electronic device to which the rendering optimization method provided in embodiments of this application is applied. The following uses an example in which the electronic device is a mobile phone to describe a procedure of the rendering optimization method provided in embodiments of this application in detail.

Figure 5:
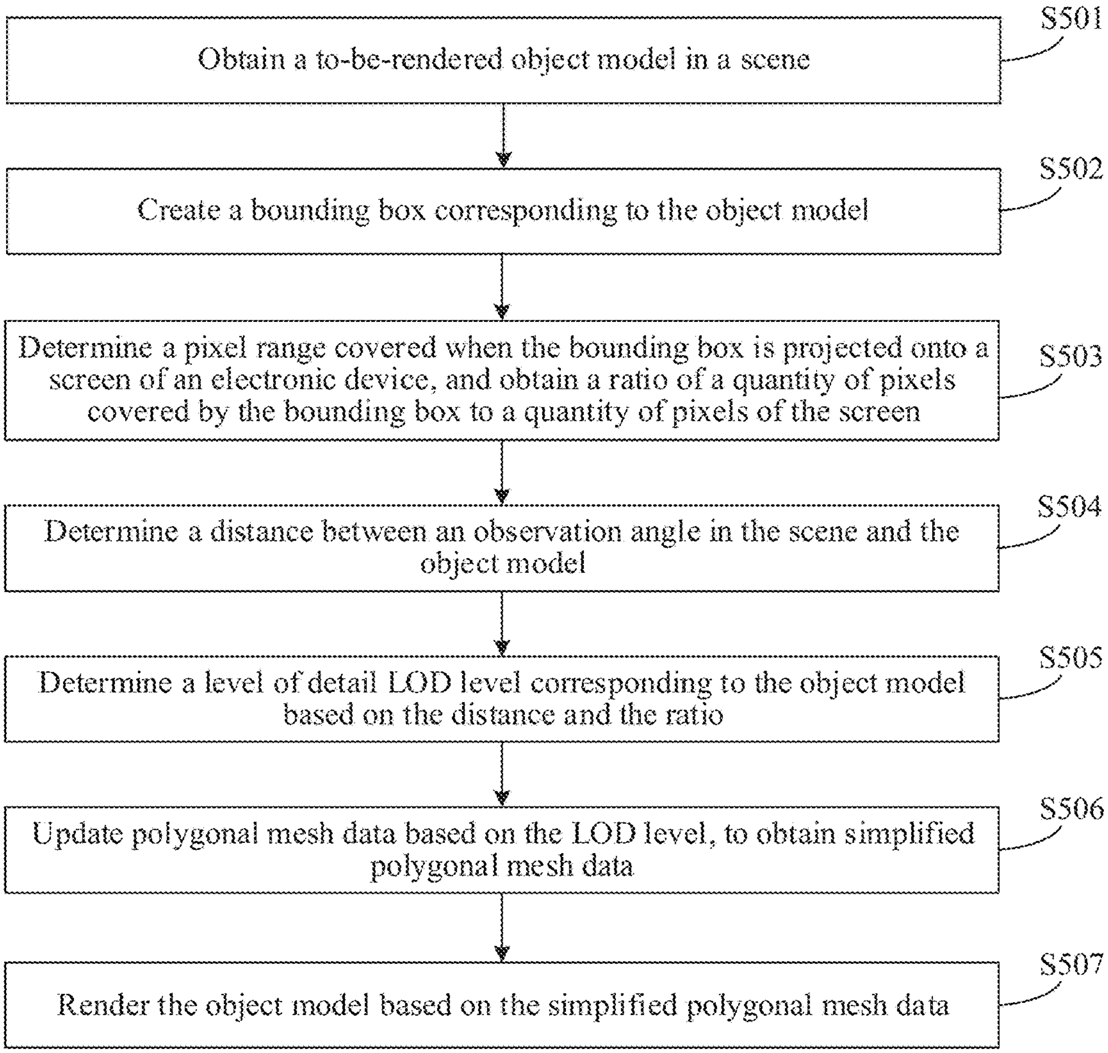
FIG. 5 is a flowchart of a rendering optimization method according to an embodiment of this application.

Refer to FIG. 5. FIG. 5 is a flowchart of a rendering method according to an embodiment of this application. The schematic flowchart shows six steps. As shown in FIG. 5, the rendering method includes S501 to S506. The method may be applied to an electronic device with the hardware structure shown in FIG. 3 and the software structure shown in FIG. 4. Alternatively, the method may be applied to an electronic device with a similar hardware structure and a similar software structure in which the electronic device has more or fewer components than those shown in the figure, or combines some components, or splits some components, or arranges different components.

S501: Obtain a to-be-rendered object model in a scene.

In this embodiment of this application, geometry corresponding to a to-be-rendered object in the scene may include a model in a 2D or 3D scene and attribute information assigned to the model. For example, geometry models may be sky, a cloud, a person, a building, grass, a tree, an article, and the like, and such models may be drawn by using a three-dimensional modeling or two-dimensional modeling application program. The model in the scene has own coordinates, and the attribute information of the model may include attribute information such as a color of the model, a material, illumination intensity, and a ray direction.

It may be understood that, for a mobile phone, a geometry model corresponding to the to-be-rendered object is formed by associated data. Therefore, the geometry model in this application may also be understood as to-be-rendered data.

It should be understood that, the to-be-rendered data may be stored in a memory of the mobile phone in a process in which the mobile phone downloads and installs an application; or in a process in which the mobile phone runs an application program, for example, an online game, the mobile phone may communicate with a server in real time and obtain to-be-rendered data in a game scene, so that the mobile phone can implement image rendering based on the to-be-rendered data.

In other words, the mobile phone may obtain to-be-rendered data by reading local data; or the mobile phone may obtain, through a communication connection with another device, to-be-rendered data from the another device in real time. A specific manner of obtaining the to-be-rendered data is not limited in this application.

In some embodiments, the mobile phone may further provide a position and an orientation in world space where a naked eye should look toward an object in the world space, that is, set a position and an orientation of a camera, and determine a projection manner and a projection matrix. The projection manner may be an orthographic projection or a perspective projection, and the projection matrix may include matrix coordinates, position coordinates of the camera, a size of a screen, a size of a view plane image, and the like.

In this embodiment of this application, the process described in S501 may be performed by the CPU shown in FIG. 2, and corresponding data is stored. After the CPU sends a render instruction to a GPU, the GPU executes, after receiving the instruction, a graphics rendering pipeline program based on the data, and completes rendering of the object model in the scene based on a process such as a ray tracing technology. In other word, S502 to S506 are performed.

S502: Create a bounding box corresponding to the object model.

In this embodiment of this application, the bounding box may be an axis aligned bounding box (AABB), an oriented bounding box (OBB), a spherical bounding box, or the like.

Figure 6:
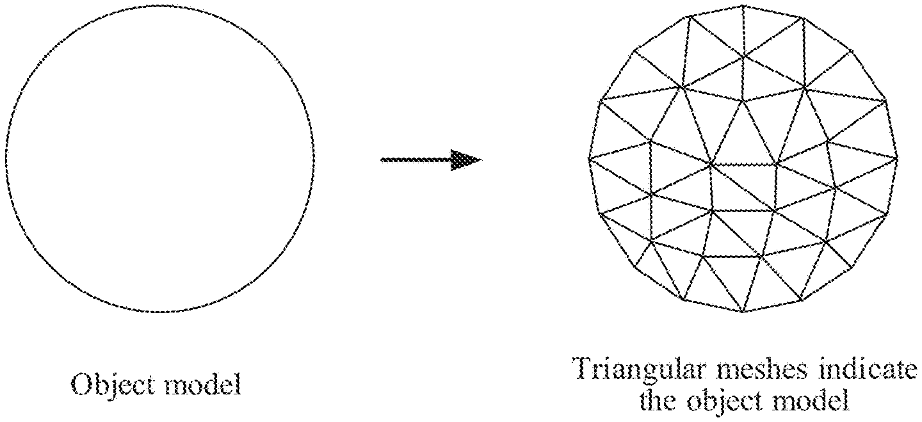
FIG. 6 is a schematic diagram of triangular meshes forming a sphere according to an embodiment of this application.

As shown in FIG. 6, FIG. 6 is a schematic diagram of triangular meshes forming a sphere. As shown in FIG. 6, the object model seen by human eyes is the sphere, the sphere is formed by a plurality of tiles in the electronic device. A tile, as a smallest plane unit forming the object model, may be a triangle, a quadrangle, or another shape. Usually, the tile is a triangular structure. An example in which the tile is the triangular structure is used for description in this application. In other words, the object model is formed by a plurality of triangular meshes. When the scene is loaded, the CPU may obtain information such as fixed point coordinates and a quantity of the triangular meshes (first polygonal mesh data), construct a vertex coordinate buffer based on initial triangular mesh vertex coordinates of the object model in the scene, and construct an index buffer based on index data of the triangular meshes. The two buffers are for creating a vulkan ray tracing acceleration structure (Acceleration Structure).

The following uses an example in which the object model is the sphere and the AABB bounding box is created for the sphere to describe determining of vertex data of the bounding box.

Figure 7:
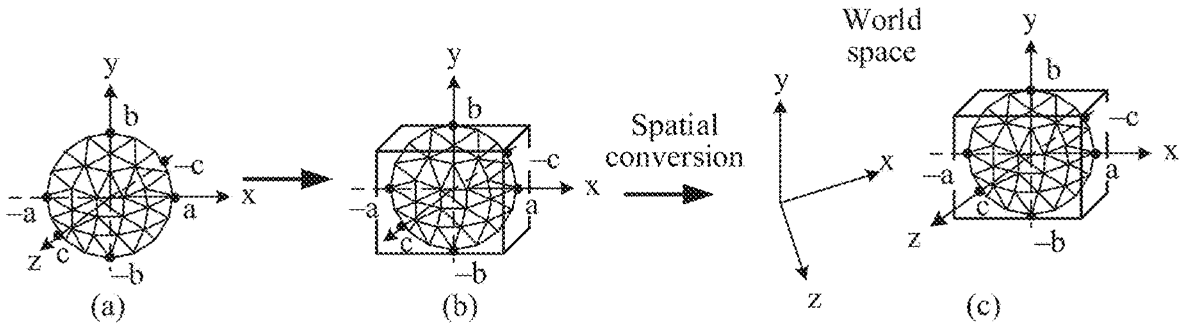
FIG. 7 is a schematic flowchart of creating a bounding box according to an embodiment of this application.

Refer to FIG. 7. FIG. 7 is a flowchart of creating a bounding box according to an embodiment of this application. First, based on coordinates of the sphere and vertex coordinates of the triangular meshes, maximum values and minimum values in an X direction, a Y direction, and a Z direction are respectively determined. If an example in which each vertex of the geometry is symmetric is used, a symmetrical geometry equation is as follows:

$$x \le |a|;$$

$$y \le |b|; \text{ and}$$

$$z \le |c|.$$

As shown in a in FIG. 7, based on the foregoing geometry equation, through calculation in the coordinates of the geometry, in the X direction, the minimum value is −a, and the maximum value is a; in the Y direction, the minimum value is −b, and the maximum value is b; and in the Z direction, the minimum value is −c and the maximum value is c. A size of the AABB bounding box is determined based on the maximum values and the minimum values in an X-axis direction, a Y-axis direction, and a Z-axis direction in the coordinates of the geometry. As shown in (b) in FIG. 7, eight vertex coordinates of the bounding box are calculated as follows: (a, b, c), (a, b, −c), (a, −b, c), (a, −b, −c), (−a, b, c), (−a, b, −c), (−a, −b, c), and (−a, −b, −c). In other words, the bounding box surrounds the sphere. After the vertex coordinates of the bounding box are determined, a spatial matrix M corresponding to the geometry in the world space is used, to apply spatial transformation of M to the vertex coordinates, and vertex coordinates of eight vertices of the bounding box in world coordinates are obtained as follows:

(a, b, c)×M, (a, b, −c)×M, (a, −b, c)×M, (a, −b, −c)×M, (−a, b, c)×M, (−a, b, −c)×M, (−a, −b, c)×M, and (−a, −b, −c)×M. After the vertex coordinates are obtained, the mobile phone determines vertex indexes. For example, triangles are constructed on one surface of the bounding box, and each face has four vertices, where two points form one triangle. Two triangles may be constructed on one surface, where two points in the two triangles are reused. Therefore, duplicate vertex data is excluded through the vertex indexes. In addition, a vertex buffer and an index buffer of the vertex data of the bounding box are constructed. In this way, when receiving the render instruction, the GPU obtains the vertex data from the buffer, to render the bounding box. In this embodiment of this application, for a specific calculation process of conversion of the vertex coordinates of the bounding box, refer to the conventional technologies. This is not described in detail in this application again.

S503: Determine a pixel range covered when the bounding box is projected onto a screen of the electronic device, and obtain a ratio of a quantity of pixels covered by the bounding box to a quantity of pixels of the screen.

In this embodiment of this application, the screen of the electronic device corresponds to a view plane image. When a width and a height of the view plane image are equal to a width and a height of the screen, and resolution of the view plane image is the same as resolution of the screen, that is, it indicates that a quantity of pixels of the view plane image is equal to the quantity of pixels of the screen, a ratio of the size of the view plane image to the size of the screen is 1:1. When the electronic device displays, through the screen, the render target after rendering, the view plane image does not need to be scaled up. However, in some embodiments, the size of the view plane image is in a proportion to the size of the screen, and the quantity of pixels of the view plane image is also in a proportion to the quantity of pixels of the screen. In this case, when the render target is displayed, it is necessary to scale up or scale down a rendered view plane image, so that a corresponding image can be properly displayed. Because the quantity of pixels of the view plane image is in the proportion to the quantity of pixels of the screen, for example, the ratio is r1, when the bounding box is projected onto the view plane image, the pixel range of the screen covered by the bounding box may also be obtained based on a pixel range of the view plane image covered by the bounding box. In the following embodiments, the covered pixel range after the bounding box is projected is first described.

Figure 8:
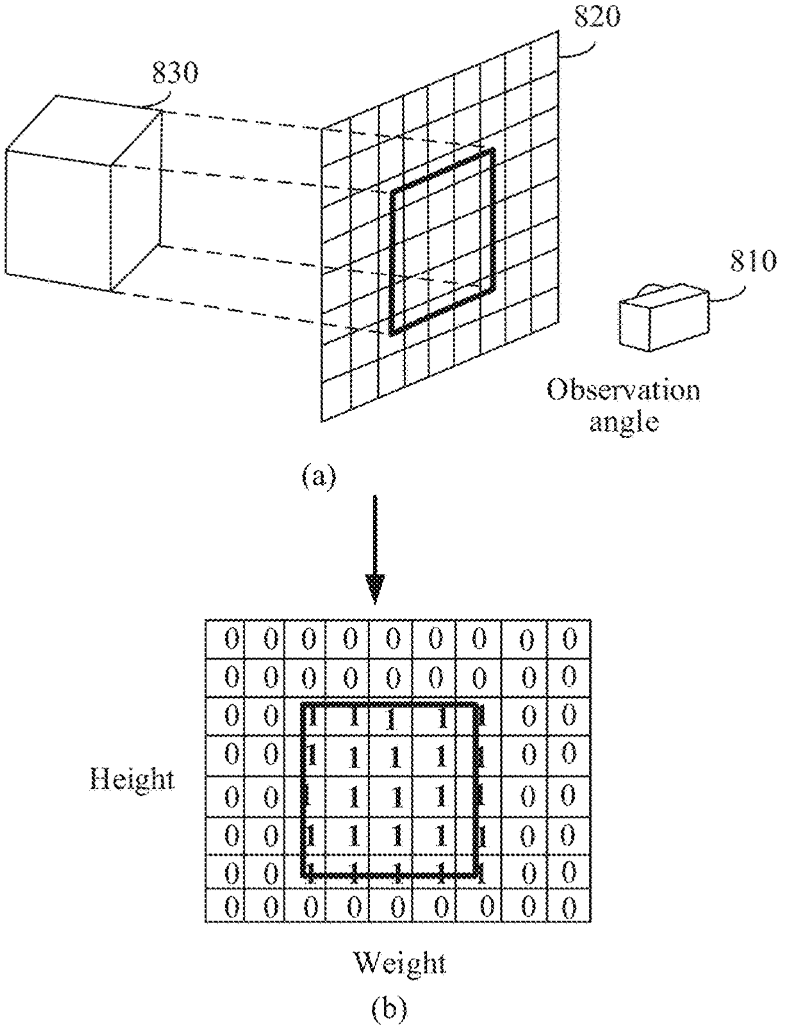
FIG. 8 is a schematic diagram of a projection of a bounding box according to an embodiment of this application.

Refer to FIG. 8. FIG. 8 is a schematic diagram of a projection of a bounding box according to an embodiment of this application. As shown in (a) in FIG. 8, there is a bounding box 830 in the world space. For n process of obtaining the bounding box 830, refer to a process of obtaining the bounding box in S502. After obtaining the position of the camera, the GPU adds camera coordinates in the world space, that is, camera origin coordinates, to simulate an observation angle 810 for observing the bounding box in real space, including a position in the world space and a direction for observing an object. The camera coordinates may be obtained by multiplying the world coordinates of the bounding box by a view matrix. Then the camera coordinates are used as an angle of view, to observe the bounding box. After the camera coordinates are determined, the camera coordinates are converted into screen coordinates, to obtain a projected view plane image 820. The projection may use the orthographic projection or the perspective projection. As shown in FIG. 8, the orthogonal projection is used as an example, and the bounding box 830 is projected onto the view plane image 820 based on an equal proportion. As shown in (b) in FIG. 8, a size of the view plane image 820, namely, a width (Width, W)×a height (Height, H), is indicated as a size (indicated as G): 9×8 by using a pixel. A quantity (indicated as H) of pixels covered after the bounding box is projected is 5×5, to obtain a pixel range covered after the bounding box is projected onto the view plane image. Last, a ratio of the quantity of pixels covered by the bounding box to the quantity of pixels of the view plane image is determined as that H/G=55/72. Specific steps are as follows: 1. Create one view plane image (a texture image), where a width×and a height are respectively W and H, and initialize all pixels to 0.2. Render a bounding box to the texture image created above, where a pixel value output by a covered pixel is 1.3. Count a quantity of pixels with pixel values of 1 in the view plane image, and divide the quantity by the quantity W×H (pixels with pixel values of 0+pixels with pixel values of 1) of pixels of the view plane image, to obtain a ratio r2 of the quantity of pixels covered by the bounding box to the quantity of pixels of the view plane image. Then, the ratio r2 is multiplied by the ratio r1 (the ratio of the quantity of pixels of the view plane image to the quantity of pixels of the screen), to obtain a ratio r3 of the quantity of pixels covered by the bounding box to the quantity of pixels of the screen.

In an embodiment of this application, when the bounding box is a bounding sphere, a calculation formula for the ratio of the quantity of pixels covered by the bounding box to the quantity of pixels of the view plane image is $4\pi R^2/(W\times H)$. R indicates a quantity of pixels on a radius of the bounding sphere, W indicates a width of the resolution of the view plane image, and H indicates a height of the resolution of the view plane image. Then, the ratio is multiplied by L to obtain a final ratio of the quantity of pixels covered by the bounding box to the quantity of pixels of the screen.

In this embodiment of this application, a ratio of a quantity a of pixels covered by the bounding box to a quantity b of pixels of the screen indicates a relationship of the two, that is, a/b. In some embodiments, a relationship a/c may also be indicated through a ratio c (c=b−a) of the quantity of pixels covered by the bounding box to a quantity of pixels not covered by the bounding box. Alternatively, a relationship b/c may be indicated based on a ratio of the quantity b of pixels of the screen to the quantity c of pixels not covered by the bounding box. In addition, the relationship may be $n^{th}$ power of a/b or a multiple. A form expressing the relationship is not limited in this application.

In some embodiments, before the projection, an identifier of a pixel corresponding to the view plane image may be initialized to 0, and after the GPU obtains a two-dimensional bounding box model, to be specific, after the bounding box is projected onto the view plane image, a value of a pixel covered by the bounding box model is changed from 0 to 1, to obtain a view plane image with an identifier shown in (b) in FIG. 8.

S504: Determine a distance (D) between an observation angle in the scene and the object model.

The observation angle refers to the aforementioned camera, and world coordinates of the object model may be obtained through conversion and calculation based on the vertex coordinates of the triangular meshes of the object model and model coordinates. The distance between the camera and the object model may be calculated through the camera coordinates and the coordinates of the object model in the world space. The camera coordinates may be coordinate values preset based on an angle required for observing the object in the scene, and the model coordinates are also preset values. A specific calculation process of the distance D is as follows:

1. Obtain a three-dimensional vector (X, Y, Z) indicating world space coordinates in a spatial matrix of the model and world space coordinates (X0, Y0, Z0) of the camera.

2. Calculate a modulus, namely, the distance D, of the vector formed by the two coordinates through Formula (1).

$$D=\sqrt{((X0-X)^2+(Y0-Y)^2+(Z0-Z)^2)} \tag{1}$$

It should be noted that, this step is a step parallel to S503, and there is no limitation on a sequence.

S505: Determine a level of detail LOD level corresponding to the object model based on the distance and the ratio.

In an embodiment of this application, the distance D and the ratio r3 are weighted respectively, and a weighted sum is calculated. For example, a weight of the distance D may be 0.3, and a weight of the ratio r3 may be 0.7. That the LOD level=0.3D+0.7×r3 is calculated.

In some embodiments, a weight may also be another proportional relationship. For example, the weight of the distance D is 0.1, and the weight of the ratio r3 is 0.9; or the weight of the distance D is 0.5, the weight of the ratio r3 is 0.5. By setting the ratio, the weight of the distance D and the weight of the ratio r3 can be adjusted more properly, which is beneficial to obtaining a LOD model with a proper level.

S506: Update polygonal mesh data based on the LOD level, to obtain simplified polygonal mesh data (second polygonal mesh data).

In some embodiments of this application, part of the polygonal mesh data may be removed by using a tile reduction algorithm. A triangular tile reduction algorithm is used as an example for description.

Figure 9:
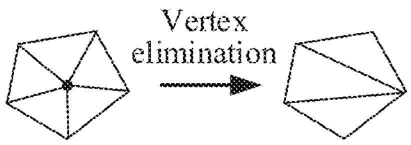
FIG. 9 is a schematic diagram of a triangular tile reduction algorithm according to an embodiment of this application.
Figure 10:
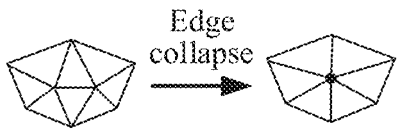
FIG. 10 is a schematic diagram of another triangular tile reduction algorithm according to an embodiment of this application.

Refer to FIG. 9 and FIG. 10. FIG. 9 and FIG. 10 are schematic diagrams of the triangular tile reduction algorithm. As shown in FIG. 9, a vertex elimination method may be used, to remove vertices shared by triangles and then recombine triangles. For the process, refer to a process from (a) to (b) in FIG. 9. A quantity of triangles is reduced by removing vertices. As shown in FIG. 10, an edge collapse method may be used, to remove edges shared by a plurality of triangles, and then recombine triangles. For the process, refer to a process from (a) to (b) in FIG. 10. The quantity of triangles is reduced through the edge collapse method. In addition, in another embodiment of this application, another tile reduction algorithm may also be used, for example, tile deletion, to be specific, an entire shared tile is deleted, to reduce the quantity of triangles. This is not limited in this application.

Figure 11:
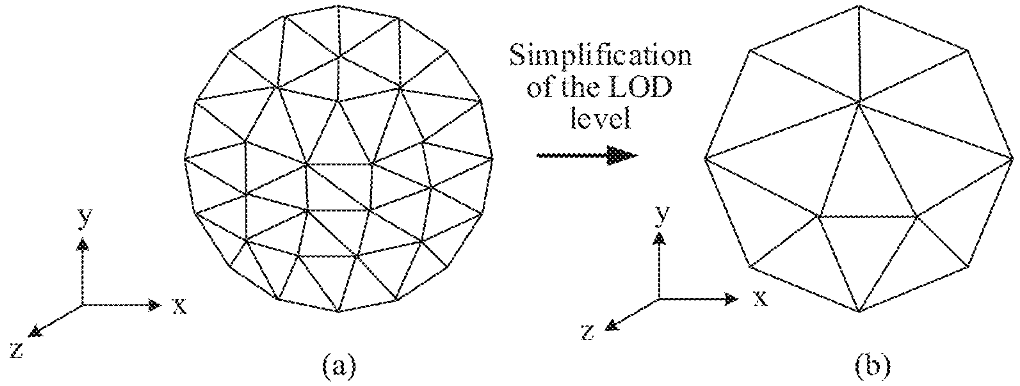
FIG. 11 is a schematic diagram of a structure of a simplified sphere according to an embodiment of this application.

After the tile reduction algorithm, polygonal mesh data of the object model is re-obtained. For a structure diagram, refer to FIG. 11. FIG. 11 is a schematic diagram of a structure of a simplified sphere. As shown in (a) in FIG. 11, the structure is an original triangular mesh structure of the object model. After tiles on the sphere model are simplified through the foregoing steps, a triangular mesh structure shown in (b) in FIG. 11 is obtained. It can be seen that, a quantity of triangular meshes after simplification is significantly less than a quantity of triangular meshes before simplification.

The GPU obtains vertex coordinates and index data of triangles of a simplified object model, updates data of a vertex buffer and data of an index buffer, to obtain and reconstruct a vulkan ray tracing acceleration structure, including the vertex coordinates and the index data of the triangles, the quantity of triangular meshes, and the like. A specific implementation process is as follows:

1. Obtain a GPU address of the vertex buffer and the index buffer of the model after tile reduction by using a vulkan instruction vkGetBufferDeviceAddressKHR.

2. Fill VkAccelerationStructureGeometryKHR and a data structure of corresponding BuildGeometryInfo (that is, initialize a ray tracing geometry information structure, and fill the address of the vertex buffer and the index buffer obtained in the foregoing step into the geometric information structure).

3. Invoke a vulkan instruction vkCmdBuildAccelerationStructuresKHR, to construct the ray tracing acceleration structure.

S507: Render the object model based on the simplified polygonal mesh data.

In an embodiment of this application, before rendering the object model, the GPU may first determine whether the object model needs ray tracing rendering. If the object model needs ray tracing rendering, the GPU performs S507. By binding the ray tracing acceleration structure obtained in S506, a shader that supports vulkan ray tracing is used, to calculate an intersection between a ray and the scene, to shade the object model.

Figure 12:
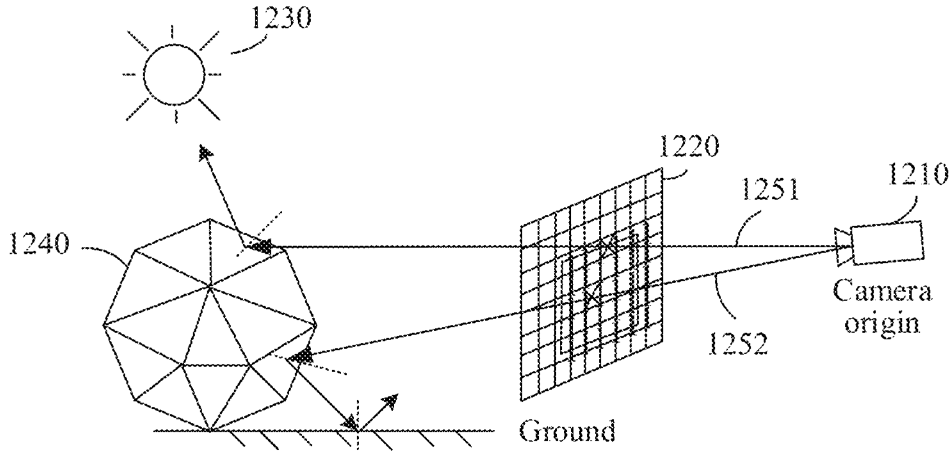
FIG. 12 is a diagram of a scene of calculating an intersection based on ray tracing according to an embodiment of this application.

Refer to FIG. 12. FIG. 12 is a diagram of a scene of calculating an intersection based on ray tracing. As shown in FIG. 12, in a three-dimensional scene, a camera 1210, a view plane image 1220, a light source 1230, a sphere model 1240 with simplified triangular meshes, a ray 1251, and a ray 1252 are included. A pixel other than a covered pixel in the view plane image 1220 does not intersect with the sphere model 1240. Therefore, during ray tracing, only a color value of a ray corresponding to the covered pixel needs to be calculated, to reduce an amount of calculation. As shown in FIG. 12, by using a camera origin as a starting point and using a unit vector from the camera origin to a corresponding pixel as a ray emission direction, the ray 1251 is emitted to the sphere model 1240 in the three-dimensional scene. After the ray intersects with one triangular tile, a reflected ray directly reaches the light source 1230, which indicates an intersection between the ray and the triangular tile is a place where a light source can irradiate. Based on intensity of the ray, a material, and the like, the GPU obtains a color value corresponding to the intersection through calculation, and outputs the color value to coordinates of a corresponding pixel. As shown in FIG. 12, after the ray 1252 intersects with the sphere model 1240, the ray is reflected to the ground, then reflected from the ground, and does not reach the light source. This indicates that an intersection between the ray 1252 and the sphere model 1240 is not irradiated by the light source, and correspondingly, an output color value is also darker than a color value during direct illumination. Based on the foregoing principle, intersections between the triangular meshes and rays are calculated, and color values corresponding to the intersections are calculated and output to corresponding pixels, to obtain a final render target image.

In some other embodiments of this application, the GPU determines that a rendering mode of the sphere model is normal rendering, for example, rasterization rendering. In this case, in an actual rendering process, an original triangular mesh data structure may also be for performing rasterization rendering on the sphere model.

It should be noted that, in the foregoing rendering process, for a calculation method that is not mentioned, for example, calculation of an intersection shading value, a method in the conventional technologies may be used for calculation. This is not described in detail in this application again.

It should be noted that, in the foregoing embodiments of this application, steps performed by the GPU may alternatively be performed by the CPU. In some embodiments, steps performed by the CPU may alternatively be performed by the GPU, or all steps may be performed by the GPU, or all steps may be performed by the CPU. This is not limited in this application.

Figure 13:
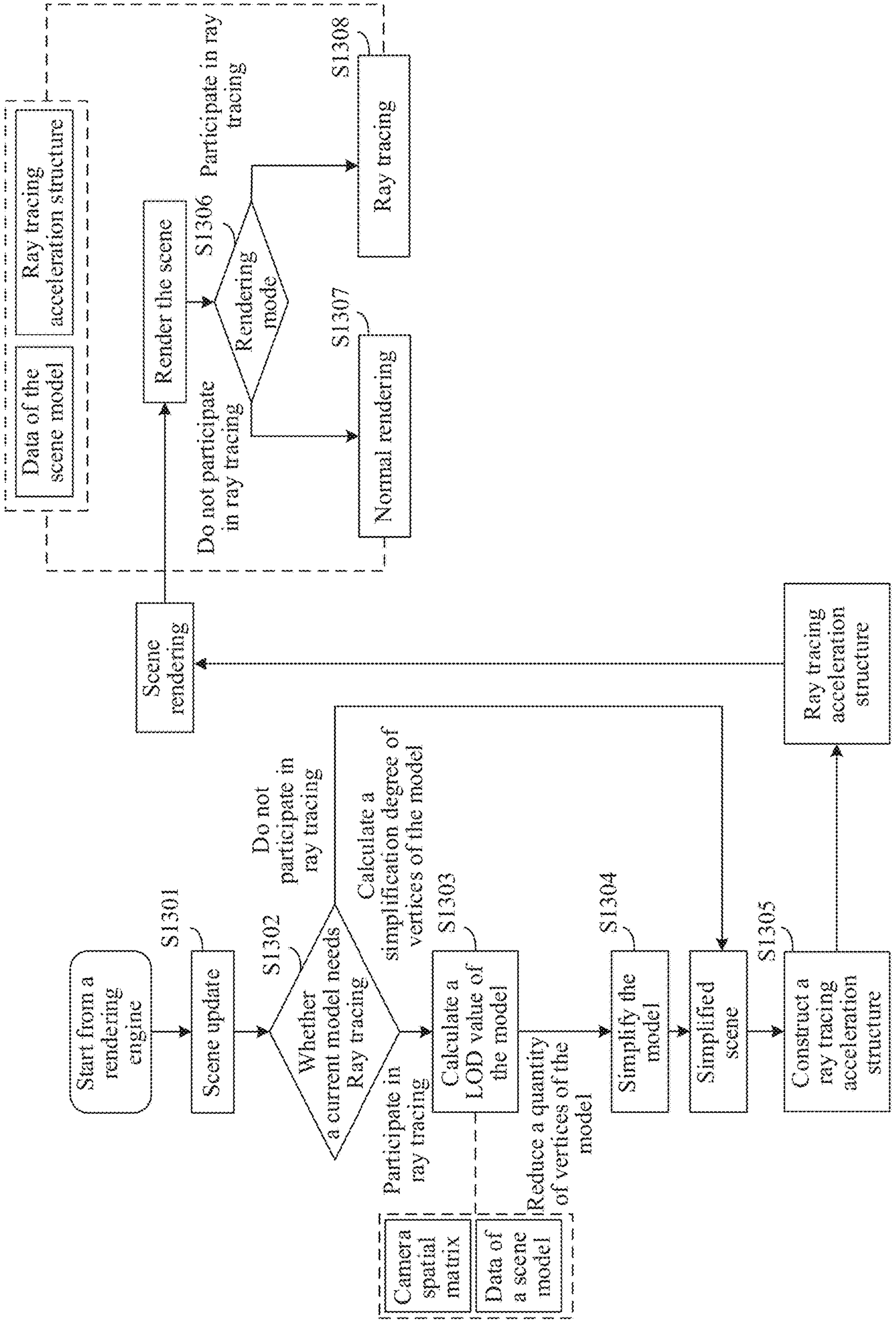
FIG. 13 is another flowchart of a rendering optimization method according to an embodiment of this application.

The rendering optimization method described in FIG. 5 is description of rendering optimization of one object model. There are many object models in the scene, and rendering methods of the object models may be different, for example, some object models need ray tracing, and some models do not need ray tracing calculation. Therefore, based on the rendering optimization method described in FIG. 5, this application may further perform subdivision or combination description on the foregoing steps, to obtain another flowchart of the rendering optimization method according to an embodiment of this application shown in FIG. 13. As shown in FIG. 13, the flowchart includes S1301 to S1308. The steps may be initiated by a rendering engine deployed in an application program. The rendering engine may be a submodule in a processor.

S1301: Perform a scene update.

The process may be understood as obtaining an object model in a scene, and performing coordinate conversion processing on the model, and the like. The rendering engine executes the scene update stage. Based on service logic information, the rendering engine performs an animation update and a physical update on the model. An updated result is displayed as a change in spatial coordinates of the model and a spatial matrix, and a change in the spatial coordinates caused by model vertex displacement. Updated data is synchronized to a vertex buffer of the model, including vertex coordinates and index data of triangular meshes, and the like. The step corresponds to S501 in FIG. 5.

S1302: Determine whether a current object model needs ray tracing.

There are many object models in a scene, some object models need rendering, and some models do not need rendering. For an object model that does not need ray tracing rendering, simplification calculation may not be required for the model. For an object model that needs ray tracing, the processor performs S1303.

S1303: Calculate a LOD level (a LOD value) of the object model. To be specific, a distance between the object model and a camera in a three-dimensional scene (world space) and a pixel proportion of the object model rendered to a screen picture are calculated first, and then weighted summation is performed on the distance and the proportion, to obtain the LOD level. For a specific calculation process, refer to S502 to S505 in FIG. 5.

S1304: Simplify the model. In the simplification process, a triangular mesh tile reduction algorithm may be used, to dynamically remove triangular meshes of the model. For example, edge collapse and vertex merging is used, to reduce a quantity of triangles in the triangular meshes and a quantity of corresponding vertices. The step corresponds to S506 in FIG. 5.

The model is simplified based on the obtained LOD value, to obtain the simplified object model.

A simplified scene in FIG. 13 refers to that all object models in the scene are stored in a storage area, including data of simplified object models and data of object models without simplification.

S1305: Construct a ray tracing acceleration structure. The step corresponds to descriptions of the ray tracing acceleration structure in S506 in FIG. 5.

During scene rendering, a GPU needs to determine whether each model in the scene needs ray tracing rendering when performing rendering. That is, S1306 is performed.

S1306: Determine a rendering mode of the model, that is, determine whether to need ray tracing.

When determining that the model does not need ray tracing, the GPU performs S1307, to perform model normal rendering on the current model.

When determining that the model needs ray tracing, the GPU performs S1308, to perform ray tracing rendering. The step corresponds to description of ray tracing in S507 in FIG. 5.

According to the rendering optimization method in embodiments of this application, a simplification degree, namely, a LOD level of a model is determined by calculating a visual range proportion of the model in a screen and a distance between an observation angle and the model, to implement dynamic adjustment of a LOD level, so that a quantity of triangular meshes forming the model is reduced when geometry of the model is maintained. In this way, calculation consumption of ray tracing can be effectively reduced, and a ray tracing rendering result with similar image quality can be efficiently generated.

Figure 14:
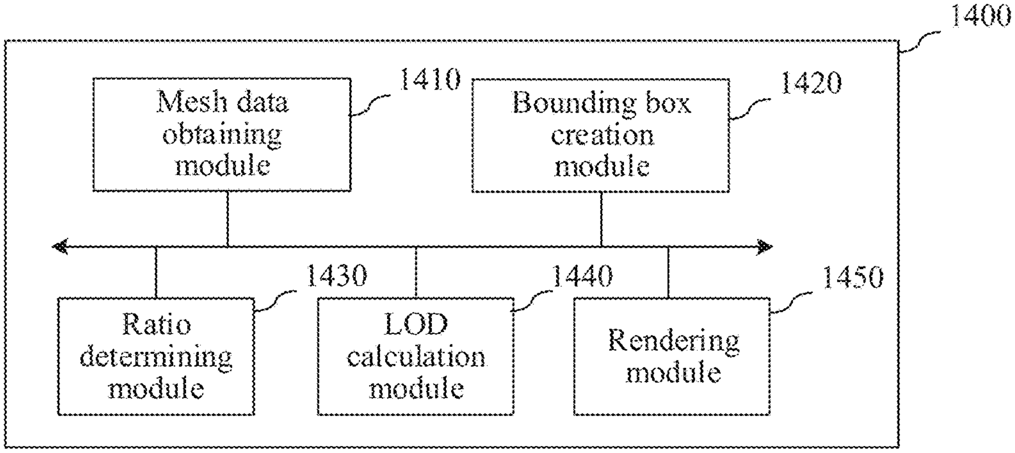
FIG. 14 is a schematic diagram of a structure of an electronic apparatus according to an embodiment of this application.

Refer to FIG. 14. This application further provides an electronic apparatus 1400, including:

- a mesh data obtaining module 1410, configured to determine first polygonal mesh data corresponding to an object model in a scene, where the first polygonal mesh data is for describing the object model;
- a bounding box creation module 1420, configured to create a bounding box corresponding to the object model based on the first polygonal mesh data;
- a ratio determining module 1430, configured to determine a pixel range covered when the bounding box is projected onto a screen of an electronic device, obtain a relationship between a quantity of pixels covered by the bounding box and a quantity of pixels of the screen, and determine a distance between an observation angle in the scene and the object model;
- a LOD calculation module 1440, configured to determine a level of detail LOD level corresponding to the object model based on the distance and the relationship, and update the first polygonal mesh data to second polygonal mesh data based on the LOD level; and
- a rendering module 1450, configured to render the object model based on the second polygonal mesh data.

According to an embodiment of this application, the LOD calculation module 1440 is further configured to perform weighted summation calculation on the distance and the relationship respectively, to obtain a summation result; and determine the LOD level based on the summation result.

According to an embodiment of this application, the ratio determining module 1430 is further configured to obtain first world coordinates of the observation angle in world space and second world coordinates of the object model in the world space, and determine the distance between the observation angle and the object model based on the first world coordinates and the second world coordinates.

According to an embodiment of this application, the LOD calculation module 1440 is configured to: remove, based on the LOD level, a part of polygonal mesh data from the first polygonal mesh information by using a polygonal mesh tile reduction algorithm to obtain the second polygonal mesh data.

According to an embodiment of this application, the rendering module 1450 is configured to:

when the rendering module 1450 determines that a rendering mode corresponding to the object model is ray tracing rendering, obtain the second polygonal mesh information; and calculate an intersection of a ray and the object model in the scene by using a ray tracing shader based on the second polygonal mesh information, and shade the object model based on the intersection.

According to an embodiment of this application, the rendering module 1450 is further configured to:

when the rendering module 1450 determines that the rendering mode corresponding to the object model is normal rendering, obtain the first polygonal mesh information corresponding to the object model in the scene, and shade the object model by using a rasterized shader.

According to an embodiment of this application, the bounding box creation module 1420 is configured to determine, based on the first polygonal mesh information, maximum values and minimum values of the object model in an X direction, a Y direction, and a Z direction in coordinates of the object model; and determine the bounding box based on the maximum values and the minimum values.

According to an embodiment of this application, the relationship between the quantity of pixels covered by the bounding box and the quantity of pixels of the screen is a ratio of the quantity of pixels covered by the bounding box to the quantity of pixels of the screen.

According to an embodiment of this application, a weight of the distance is set to range from 0.1 to 0.5, and a weight of the ratio ranges from 0.5 to 0.9.

According to an embodiment of this application, the weight of the distance is set to 0.3, and the weight of the ratio is 0.7.

According to an embodiment of this application, the first polygonal mesh information includes a quantity of polygons corresponding to the object model not simplified through the LOD level, and vertex coordinates and vertex indexes of the polygon.

According to an embodiment of this application, the second polygonal mesh information includes a quantity of polygons corresponding to the object model simplified based on the LOD level, and the vertex coordinates and the vertex indexes of the polygon.

According to an embodiment of this application, the polygon is a triangle.

It should be noted that, functions and effects of the foregoing modules are described in detail in the embodiments shown in FIG. 5. For details, refer to corresponding descriptions in FIG. 5. This is not described herein again.

This application further provides an electronic device, including:

a memory, configured to store instructions executed by one or more processors of the device; and a processor, configured to perform the method explained with reference to FIG. 5 to FIG. 13 in the foregoing embodiments.

This application further provides a computer-readable storage medium, storing a computer program, where the computer program, when run by a processor, enables the processor to perform the method explained with reference to FIG. 5 to FIG. 13 in the foregoing embodiments.

This application further provides a computer program product including instructions, where the computer program product, when run on an electronic device, enables a processor to perform the method shown in FIG. 5 to FIG. 13 in the foregoing embodiments.

Figure 15:
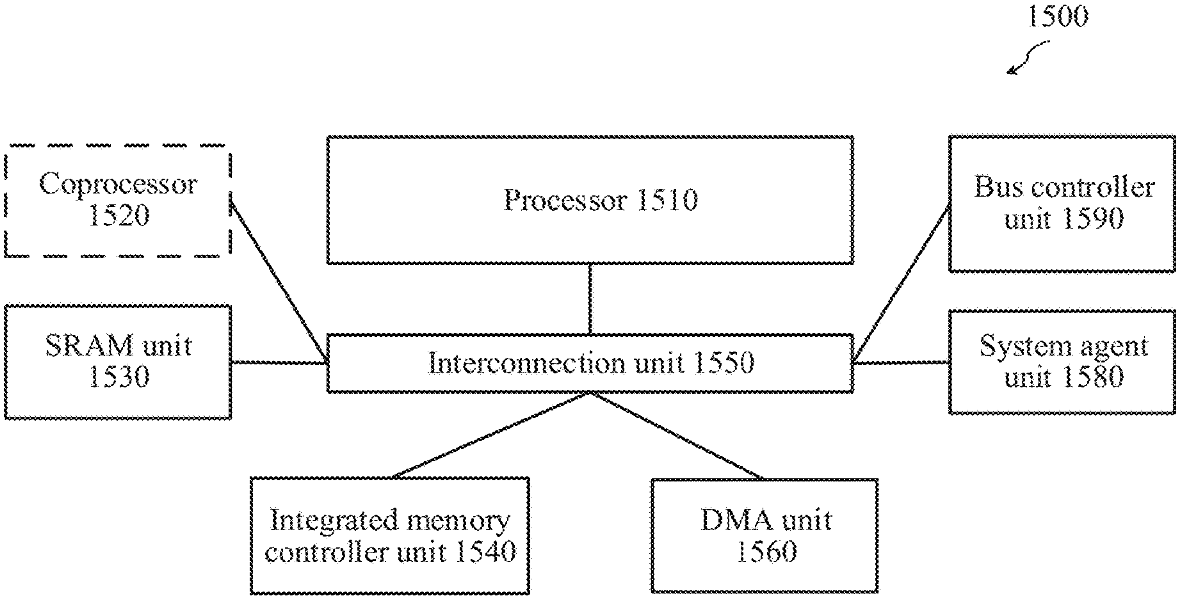
FIG. 15 is a block diagram of a system on chip according to some embodiments of this application.

Now refer to FIG. 15. FIG. 15 is a block diagram of a SoC (System on Chip) 1500 according to an embodiment of this application. In FIG. 15, similar components have same reference numerals. In addition, a dashed box is an optional feature of a more advanced SoC. In FIG. 15, the SoC 1500 includes an interconnection unit 1550, which is coupled to an application processor 1510; a system agent unit 1580; a bus controller unit 1590; an integrated memory controller unit 1540; a set of or one or more coprocessors 1520, which may include integrated graphics logic, an image processor, an audio processor, and a video processor; a static random access memory (SRAM) unit 1530; and a direct memory access (DMA) unit 1560. In one embodiment, the coprocessor 1520 includes a dedicated processor, for example, a network or communication processor, a compression engine, a general purpose computing on GPU (GPGPU), a high throughput many integrated core (MIC) processor, or an embedded processor.

The static random access memory (SRAM) unit 1530 may include one or more computer-readable media for storing data and/or instructions. A computer-readable storage medium may store instructions, and specifically, store temporary and permanent copies of the instructions. The instructions may include the following: When the instructions are executed by at least one unit in a processor, the SoC 1500 is enabled to perform the method according to the foregoing embodiments. For details, refer to the method explained in FIG. 5 and FIG. 13. This is not described herein again.

Embodiments of all mechanisms disclosed in this application may be implemented in hardware, software, firmware, or a combination of these implementation methods. Embodiments of this application may be implemented as a computer program or program code executed on a programmable system. The programmable system includes at least one processor, a storage system (including a volatile and non-volatile memory and/or a storage element), at least one input device, and at least one output device.

The program code may be used for inputting instructions, to execute functions described in this application and generate output information. The output information may be used in one or more output devices in a known manner. For an objective of this application, a processing system includes any system having a processor such as a digital signal processor (DSP), a microcontroller, an application specific integrated circuit (ASIC), or a microprocessor.

The program code may be implemented in a high-level programming language or an object-oriented programming language, to communicate with the processing system. When necessary, an assembly language or a machine language may also be used for implementing the program code. In fact, the mechanisms described in this application are not limited to the scope of any particular programming language. In any case, the language may be a compiled language or an interpreted language.

In some cases, the disclosed embodiments may be implemented in hardware, firmware, software, or any combination thereof. The disclosed embodiments may also be implemented as instructions carried or stored thereon by one or more temporary or non-transitory machine-readable (for example, computer-readable) storage media, which may be read and executed by one or more processors. For example, the instructions may be distributed through a network or through another computer-readable medium. Therefore, the machine-readable medium may include any mechanism for storing or transmitting information in a machine-readable form (for example, a computer), including but not limited to a floppy disk, a compact disk, an optical disk, a compact disc read only memory (CD-ROM), a magneto-optical disk, a read only memory (ROM), a random access memory (RAM), an erasable programmable read only memory (EPROM), an electrically erasable programmable read only memory (EEPROM), a magnetic card or an optical card, a flash memory, or a tangible machine-readable memory for transmitting information (for example, a carrier, an infrared signal, or a digital signal) using the Internet in electrical, optical, acoustic, or another form of a propagation signal. Therefore, the machine-readable medium includes any type of machine-readable medium suitable for storing or transmitting electronic instructions or information in the machine-readable form (for example, the computer).

In the accompanying drawings, some structures or method features may be shown in a particular arrangement and/or order. However, it should be understood that, such specific arrangement and/or order may not be required. In some embodiments, the features may be arranged in a different manner and/or order from a manner and/or order shown in the accompanying drawings of the specification. In addition, structures or method features included in a particular figure are not meant to imply that the features are required in all embodiments. In some embodiments, the features may not be included or may be combined with other features.

It should be noted that, units/modules mentioned in device embodiments of this application are logical units/modules. Physically, one logical unit/module may be a physical unit/module, or may be a part of a physical unit/module, or may be implemented through a combination of a plurality of physical units/modules. Physical implementations of the logical units/modules are not the most important, but a combination of functions implemented by the logical units/modules is only a key for resolving the technical problem provided in this application. In addition, to highlight the innovative part of this application, the foregoing device embodiments of this application do not introduce a unit/module that is not very relevant to the technical problem provided in this application. However, this does not indicate that other units/modules do not exist in the foregoing device embodiments.

It should be noted that, relational terms herein such as first and second are used only to differentiate an entity or operation from another entity or operation, and do not require or imply any actual relationship or sequence between these entities or operations. Moreover, the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

Although this application has been illustrated and described with reference to some preferential embodiments of this application, a person of ordinary skill in the art should understand that, various changes may be made in forms and details without departing from the spirit and scope of this application.

The invention claimed is:

1. A rendering optimization method, applied to an electronic device, the method comprising:

determining first polygonal mesh data corresponding to an object model in a scene, wherein the first polygonal mesh data is for describing the object model;

creating a bounding box corresponding to the object model based on the first polygonal mesh data;

determining a pixel range covered when the bounding box is projected onto a screen of the electronic device, obtaining a relationship between a quantity of pixels covered by the bounding box and a quantity of pixels of the screen, and determining a distance between an observation angle in the scene and the object model;

determining a level of detail (LOD) level corresponding to the object model based on the distance and the relationship, wherein the determining the LOD level corresponding to the object model based on the distance and the relationship comprises:

performing a weighted summation calculation on the distance and the relationship respectively, to obtain a summation result; and determining the LOD level based on the summation result;

updating the first polygonal mesh data to second polygonal mesh data based on the LOD level; and rendering the object model based on the second polygonal mesh data.

2. The method according to claim 1, wherein the determining the distance between the observation angle in the scene and the object model comprises:

obtaining first world coordinates of the observation angle in world space and second world coordinates of the object model in the world space; and determining the distance between the observation angle and the object model based on the first world coordinates and the second world coordinates.

3. The method according to claim 1, wherein the updating the first polygonal mesh data to the second polygonal mesh data based on the LOD level comprises:

removing, based on the LOD level, a part of polygonal mesh data from the first polygonal mesh data by using a polygonal mesh tile reduction algorithm to obtain the second polygonal mesh data.

4. The method according to claim 1, wherein the rendering the object model based on the second polygonal mesh data comprises:

determining that a rendering mode corresponding to the object model is ray tracing rendering;

obtaining the second polygonal mesh data; and calculating an intersection of a ray and the object model in the scene by using a ray tracing shader based on the second polygonal mesh data, and shading the object model based on the intersection.

5. The method according to claim 1, wherein the rendering the object model based on the second polygonal mesh data comprises:

determining that a rendering mode corresponding to the object model is rasterization rendering;

obtaining the first polygonal mesh data corresponding to the object model in the scene; and shading the object model by using a rasterized shader.

6. The method according to claim 1, wherein the creating the bounding box corresponding to the object model based on the first polygonal mesh data comprises:

determining, based on the first polygonal mesh data, maximum values and minimum values of the object model in an X direction, a Y direction, and a Z direction in coordinates of the object model; and determining the bounding box based on the maximum values and the minimum values.

7. The method according to claim 1, wherein the relationship between the quantity of pixels covered by the bounding box and the quantity of pixels of the screen is a ratio of the quantity of pixels covered by the bounding box to the quantity of pixels of the screen.

8. The method according to claim 1, wherein a weight of the distance in the weighted summation calculation is in a range from 0.1 to 0.5, and a weight of the relationship in the weighted summation calculation is in a range from 0.5 to 0.9.

9. The method according to claim 8, wherein the weight of the distance is set to 0.3, and the weight of the relationship is 0.7.

10. The method according to claim 1, wherein the first polygonal mesh data comprises a first quantity of polygons corresponding to the object model.

11. The method according to claim 10, wherein the second polygonal mesh data comprises a second quantity of polygons corresponding to the object model, wherein the second quantity is less than the first quantity.

12. The method according to claim 1, wherein polygons of the first polygonal mesh data are triangles.

13. An electronic device, comprising:

one or more memories storing one or more programs; and a processor configured to execute the one or more programs to cause the electronic device to perform operations comprising:

determining first polygonal mesh data corresponding to an object model in a scene, wherein the first polygonal mesh data is for describing the object model;

creating a bounding box corresponding to the object model based on the first polygonal mesh data;

determining a pixel range covered when the bounding box is projected onto a screen of the electronic device, obtaining a relationship between a quantity of pixels covered by the bounding box and a quantity of pixels of the screen, and determining a distance between an observation angle in the scene and the object model;

determining a level of detail (LOD) level corresponding to the object model based on the distance and the relationship, wherein the determining the LOD level corresponding to the object model based on the distance and the relationship comprises:

performing a weighted summation calculation on the distance and the relationship respectively, to obtain a summation result; and determining the LOD level based on the summation result;

updating the first polygonal mesh data to second polygonal mesh data based on the LOD level; and rendering the object model based on the second polygonal mesh data.

14. The electronic device according to claim 13, wherein the determining the distance between the observation angle in the scene and the object model comprises:

obtaining first world coordinates of the observation angle in world space and second world coordinates of the object model in the world space; and determining the distance between the observation angle and the object model based on the first world coordinates and the second world coordinates.

15. The electronic device according to claim 13, wherein the updating the first polygonal mesh data to the second polygonal mesh data based on the LOD level comprises:

removing, based on the LOD level, a part of polygonal mesh data from the first polygonal mesh data by using a polygonal mesh tile reduction algorithm to obtain the second polygonal mesh data.

16. The electronic device according to claim 13, wherein the rendering the object model based on the second polygonal mesh data comprises:

determining that a rendering mode corresponding to the object model is ray tracing rendering;

obtaining the second polygonal mesh data; and calculating an intersection of a ray and the object model in the scene by using a ray tracing shader based on the second polygonal mesh data, and shading the object model based on the intersection.

17. A non-transitory computer-readable storage medium storing a computer program that, when executed by a processor, causes an electronic device to perform operations comprising:

determining first polygonal mesh data corresponding to an object model in a scene, wherein the first polygonal mesh data is for describing the object model;

creating a bounding box corresponding to the object model based on the first polygonal mesh data;

determining a pixel range covered when the bounding box is projected onto a screen of the electronic device, obtaining a relationship between a quantity of pixels covered by the bounding box and a quantity of pixels of the screen, and determining a distance between an observation angle in the scene and the object model;

determining a level of detail (LOD) level corresponding to the object model based on the distance and the relationship, wherein the determining the LOD level corresponding to the object model based on the distance and the relationship comprises:

performing a weighted summation calculation on the distance and the relationship respectively, to obtain a summation result; and determining the LOD level based on the summation result;

updating the first polygonal mesh data to second polygonal mesh data based on the LOD level; and rendering the object model based on the second polygonal mesh data.

18. The computer-readable storage medium according to claim 17, wherein the determining the distance between the observation angle in the scene and the object model comprises:

obtaining first world coordinates of the observation angle in world space and second world coordinates of the object model in the world space; and determining the distance between the observation angle and the object model based on the first world coordinates and the second world coordinates.

19. The computer-readable storage medium according to claim 17, wherein the updating the first polygonal mesh data to the second polygonal mesh data based on the LOD level comprises:

removing, based on the LOD level, a part of polygonal mesh data from the first polygonal mesh data by using a polygonal mesh tile reduction algorithm to obtain the second polygonal mesh data.

20. The computer-readable storage medium according to claim 17, wherein the rendering the object model based on the second polygonal mesh data comprises:

determining that a rendering mode corresponding to the object model is ray tracing rendering;

obtaining the second polygonal mesh data; and calculating an intersection of a ray and the object model in the scene by using a ray tracing shader based on the second polygonal mesh data, and shading the object model based on the intersection.

* * * * *